(No Model.)
F. M. PALMITER.
CHOPPING KNIFE.
No. 468,893. Patented Feb. 16, 1892.
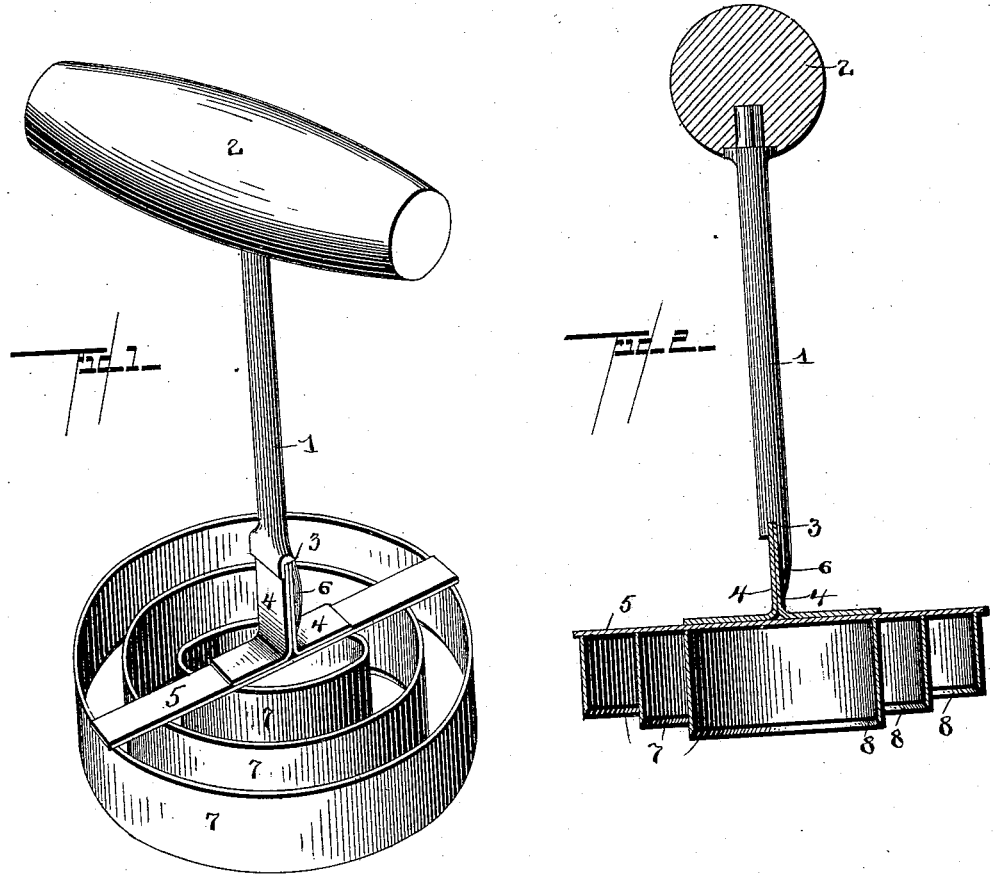
Witnesses
H. G. Seitz
H. J. Riley
Inventor
Frank M. Palmiter
By his Attorneys,
C. A. Snow & Co.

UNITED STATES PATENT OFFICE.

FRANK M. PALMITER, OF MILTON, WISCONSIN.

CHOPPING-KNIFE.

SPECIFICATION forming part of Letters Patent No. 468,893, dated February 16, 1892.

Application filed September 2, 1891. Serial No. 404,521. (No model.)

*To all whom it may concern:*

Be it known that I, FRANK M. PALMITER, a citizen of the United States, residing at Milton, in the county of Rock and State of Wisconsin, have invented a new and useful Chopping-Knife, of which the following is a specification.

The invention relates to improvements in chopping-knives.

The object of the present invention is to provide a simple, inexpensive, strong, and durable chopping-knife which will not become choked, which may be readily cleaned, and which will accommodate itself to the sides of a concave chopping bowl or vessel.

The invention consists in the construction and novel combination and arrangement of parts hereinafter fully described, illustrated in the accompanying drawings, and pointed out in the claims hereto appended.

In the drawings, Figure 1 is a perspective view of a chopping-knife constructed in accordance with this invention. Fig. 2 is a longitudinal sectional view, the section being taken longitudinally of the cross-bar.

Referring to the accompanying drawings, 1 designates a stem, to one end of which is secured a handle 2, and the other end of the stem is flattened and provided with a recess 3, in which are secured angle-plates 4, which secure a cross-bar 5 to the end 6 of the stem. The cross-bar has attached to its outer face a series of concentric bands or rings 7, which have their outer edges 8 sharpened and adapted to cut, and these concentric ring-shaped blades have their cutting-edges 8 arranged in different horizontal planes, the inner blade extending outward beyond the adjacent blade and the latter being extended beyond the outer blades. This arrangement of blades enables the chopping-knife to accommodate itself to a concave chopping board or vessel and brings all the blades in use at the same time. The width of the blades from the cutting or outer edge to the inner or upper edge varies, increasing from the outermost blade to the innermost one, and the upper or inner edges of all the blades are arranged in the same plane.

From the foregoing it will be readily seen that the chopping-knife is simple and inexpensive in construction, strong and durable, that it will not become choked and may be readily cleaned, and that it will accommodate itself to the sides of a vessel, and that all blades will be brought into use at the same time.

What I claim is—

1. A chopping-knife provided with a series of concentric ring-shaped blades having their cutting-edges arranged in different horizontal planes, whereby the knife will accommodate itself to the sides of a vessel, substantially as described.

2. A chopping-knife comprising a stem, a handle secured to one end of the stem, a cross-bar secured to the other end of the stem, and a series of concentric ring-shaped blades having their cutting-edges arranged in different horizontal planes, whereby the knife will accommodate itself to the sides of a vessel, substantially as described.

In testimony that I claim the foregoing as my own I have hereto affixed my signature in presence of two witnesses.

FRANK M. PALMITER.

Witnesses:
W. S. ARNOLD,
E. R. IMWAER.